Nov 1, 1949.  W. L. BINGAMAN  2,486,386
JIG FOR PORTABLE TOOLS
Filed May 15, 1947
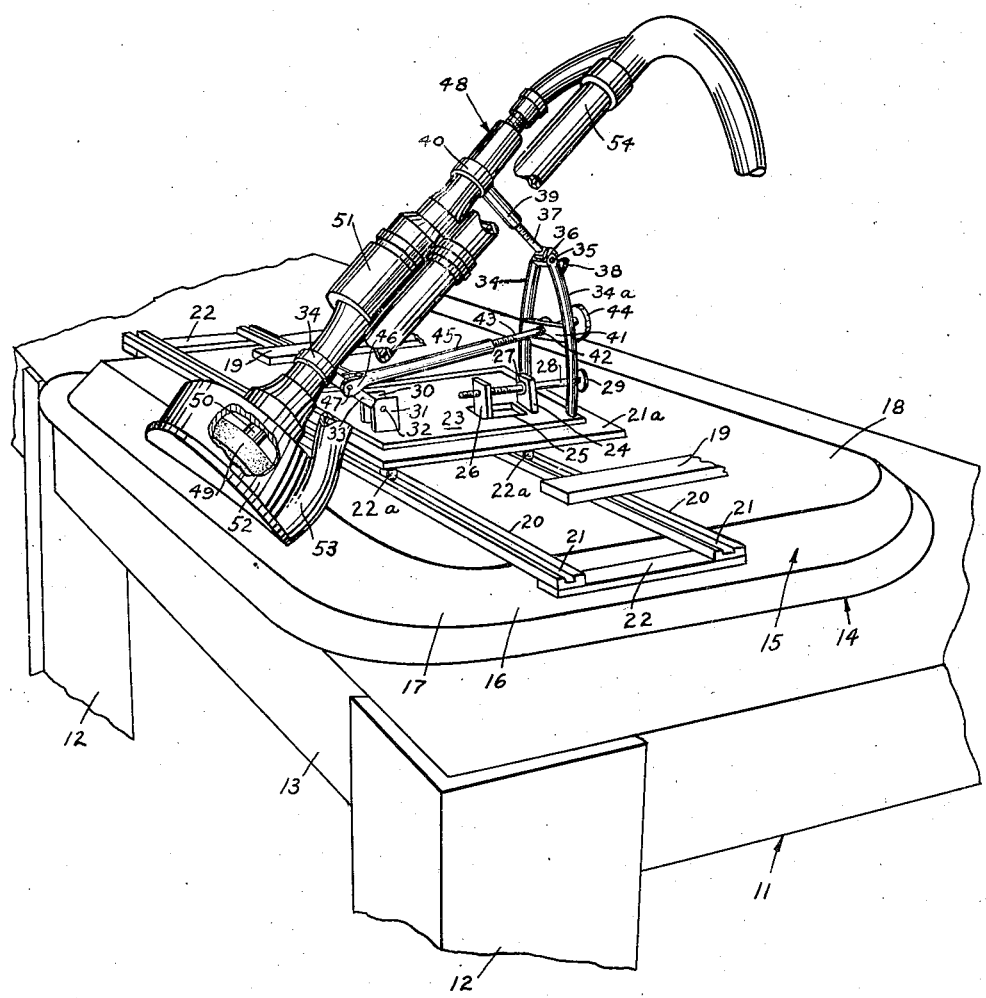
INVENTOR.
WILLIAM L. BINGAMAN
BY
*M. O. Hayes*
ATTORNEY Patented Nov. 1, 1949

2,486,386

UNITED STATES PATENT OFFICE 2,486,386

JIG FOR PORTABLE TOOLS

William L. Bingaman, Folcroft, Pa.

Application May 15, 1947, Serial No. 748,329

5 Claims. (Cl. 51—241)

(Granted under the act of March 3, 1883, as amended April 30, 1928; 370 O. G. 757)

The present invention concerns a jig and particularly concerns a jig suitable for holding a portable tool such as a grinder relative to a piece of work and in which the jig is movable relative to the piece of work and the portable tool is movable relative to the jig.

In performing tooling operations such as grinding upon a piece of work such as ship hatch it is found desirable to provide a jig for holding the tool relative to the piece of work in order to eliminate manual holding of the tool. It is necessary that the jig be mounted for movement relative to the work in order that the tool can be adjusted into contact with the work along a selected path such as the straight sides of a hatch and the curved corners thereof. It is also necessary that the jig be constructed so that the tool be movable relative to the jig in order to provide further adjustment of the tool relative to the work.

The present invention provides a tool-holding jig that fulfills these requirements. The jig is adapted for movement of translation or rotation relative to the work. The tool is held by a pair of arms that are hinged on the jig for rotation in a common plane to move the tool toward and away from the work. One of the arms is adjustable to vary its length so that the angular relation of the tool to the jig and the work can be varied. The base of the jig is mounted for sliding movement on a carriage forming part of the jig so that sliding movement of the tool towards and away from the work can be effected.

An object of the invention is to provide a jig for holding a portable tool relative to a piece of work.

Another object is to provide a jig for a portable tool in which the jig is provided with a pair of arms hinged on a base for rotation in a common plane to hold the tool and with one of the arms of variable length, and in which the base is mounted for sliding movement on a carriage mounted adjacent the piece of work.

Further objects and advantages of this invention, as well as its construction, arrangement and operation will be apparent from the following description and claims in connection with the accompanying drawing in which the single figure is a perspective view of a preferred form of the invention.

In the drawing is shown a work bench 11 having legs 12 and a bed 13. Mounted upon bed 13 is a piece of work 14 that is illustrated as being the hatch of a ship and provided with a bevelled surface 15 to be ground. Bevelled surface 15 includes straight portions 16 and curved portions 17. Hatch 14 is provided with a flat face 18.

Detachably secured to face 18 by means of clamps 19 (broken away for clarity of illustration) is a pair of parallel rails 20 each provided with a groove 21 and secured together at their extremities by cross ties 22. Mounted for movement upon rails 20 is a flat carriage 21a provided on its lower surface with rollers 22a which are disposed within grooves 21. Resting upon the upper surface of carriage 21a is a flat support 23 that is adapted for sliding movement upon carriage 21a. Mounted upon the upper surface of support 23 is a lug 24 adjacent to which is formed a slot 25. Extending upwardly through slot 25 is a lug 26 secured at its lower end to the surface of carriage 21a. Provided in lug 24 is a thrust element 27. A rod 28 is mounted for free rotation in thrust element 27 and at one extremity is threaded through lug 26 and at its other extremity is provided with a handwheel 29. Rotation of handwheel 29 effects relative movement between lugs 26 and 24 and thus between carriage 21a and support 23, respectively.

Extending upwardly from carriage 23 is a pair of parallel spaced lugs 30 and 31 through which extends a hinge pin 32. Mounted for rotation upon hinge pin 32 is an arm 33 to the outer end of which is secured clamp 34 for holding a tool as hereinafter described. Preferably, clamp 34 is flexibly mounted with respect to arm 33.

Mounted upon carriage 23 is a pair of frame elements 34a through the upper extremity of which extends a hinge pin 35 disposed in parallel relationship to the hinge pin 32. Mounted for rotation upon hinge pin 35 is a thrust block 36. Mounted for free rotation in thrust block 36 is a rod 37, one extremity of which is provided with a handwheel 38 and the other extremity of which is threaded into one extremity of a tube 39. The other extremity of tube 39 is provided with a clamp 40 that preferably is mounted flexibly with respect to tube 39 and is adapted to hold a tool as hereinafter described. Rotation of handwheel 38 varies the distance between thrust block 36 and clamp 40. Rod 37 and tube 39 together form an arm of variable length mounted for rotation in a common plane with arm 33.

Extending between frame members 34a below thrust block 36 is a crosspiece 41 provided with a thrust element 42. Mounted for free rotation in thrust element 42 is a rod 43, one extremity of which is provided with a handwheel 4 and the other extremity of which is threaded into one extremity of a tube 45. The other extremity of tube 45 is provided with a clevis 46 that fits over arm 33. A pin 47 extends through clevis 46 and arm 33. Pin 47 is parallel to hinge pin 32 and hinge pin 35. Rotation of handwheel 44 varies the distance between thrust element 42 and clevis pin 47.

Clamps 34 and 40 are arranged to engage a portable grinding tool assembly 48 that includes a grinding wheel 49 mounted upon a shaft 50 and a motor 51 for causing rotation thereof. Adjacent grinding wheel 49 is provided a shield 52 having a dust-protection outlet 53 and a dust-escape tube 54.

In operation carriage 21a is mounted with rollers 22a thereof in grooves 21 of rails 20, the latter being secured in a selected position by means of clamps 19. Portable grinding tool 48 is mounted in clamps 34 and 40. Handwheel 29 is turned to slide support 23 into selected position upon carriage 21a. Handwheel 44 is turned to effect rotation of arm 33. Handwheel 38 is turned to adjust the length of arm formed by rod 37 and tube 39 to position grinding wheel 49 in desired tilting relation with respect to bevelled surface 15 which is to be ground. By the adjustments described grinding wheel 49 can be brought into contact with bevelled work surface 15 in any desired relationship and rolling of carriage 21a along rails 20 causes grinding wheel 49 to contact bevelled surface 15 along a path on the straight portion 16 of bevelled surface 15. When it is desired to grind a rounded corner 17 on bevelled surface 15, carriage 21a is removed from rails 20 and a pivot (not shown) can be provided beneath carriage 21a and disposed in a center punch mark (not shown) of curved portion 17 so that grinding wheel 49 describes an arcuate path in contact with corner 17.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig for holding a tool relative to a piece of work, said jig comprising means defining a path relative to the work, a base mounted for movement along the path, and a pair of arms individually hinged in spaced relation on said base for rotation in a common plane, said arms being adapted to be clamped to a tool, at least one of said arms being adjustable to vary the length thereof and adjust the angle of tilt of the tool relative to the base, said arms being rotatable together to move the tool relative to the base.

2. A jig for holding a tool relative to a piece of work, said jig comprising a carriage adapted to be mounted relative to a piece of work, a base mounted for sliding movement along a path on said carriage, means for sliding said base, a pair of arms individually hinged in spaced relation on said base for rotation in a common plane substantially normal to the path, said arms being adapted to be clamped to a tool, at least one of said arms being adjustable to vary the length thereof and adjust the angle of tilt of the tool relative to the base, said arms being rotatable together to move the tool toward and away from the base.

3. A jig for holding a tool relative to a piece of work, said jig comprising a carriage adapted to be mounted relative to a piece of work, a base mounted for sliding movement along a path on said carriage, means for sliding said base, a pair of arms individually hinged in spaced relation on said base for rotation in a common plane substantially normal to the path, said arms being adapted to be clamped to a tool, at least one of said arms being adjustable to vary the length thereof and adjust the angle of tilt of the tool relative to the base, and means for causing rotation of said arms to move the tool toward and away from the base.

4. A jig for holding a tool relative to a piece of work, said jig comprising a carriage adapted to be mounted relative to a piece of work, a base mounted for sliding movement along a path on said carriage, means for sliding said base, a pair of arms individually hinged in spaced relation on said base for rotation in a common plane substantially normal to the path, said arms being adapted to clamp a tool, at least one of said arms being adjustable to vary the length thereof and adjust the angle of tilt of the tool relative to the base, and a rod connected at one end to one of said arms and at the other end connected to said base, said rod being adjustable to vary the length thereof and rotate the connected arm to move the tool toward and away from the base.

5. A jig for holding a portable tool relative to a piece of work, said jig comprising a carriage adapted to be mounted for movement relative to the piece of work, a base disposed in sliding contact with said carriage, a first lug on said base on the side away from said carriage, a slot in said base adjacent the first lug, a second lug on the carriage extending through the slot, a screw connecting the lugs for translating the lugs toward and away from each other to effect relative translation of said base and carriage, a pair of arms individually hinged in spaced relation on said base for rotation in a common plane, said arms remote from their hinges being adapted to clamp a tool, said arms being disposed in substantially parallel relationship, at least one of said arms being adjustable to vary the length thereof and adjust the angle of tilt of the tool relative to said base, and a rod connected at one end to one of said arms and at the other end connected to said base, said rod being adjustable to vary the distance from said arm to said base and rotate the connected arm to move the tool toward and away from the base.

WILLIAM L. BINGAMAN.

REFERENCES CITED

The following references are of record in the file of this patent:

UNITED STATES PATENTS

| Number | Name | Date |
| --- | --- | --- |
| 398,741 | Morrison et al. | Feb. 26, 1889 |